Sept. 26, 1950            C. M. MOORE            2,523,874
HOSE COUPLING DEVICE AND COMPRESSION
MEMBER FOR USE THEREIN
Filed June 29, 1949
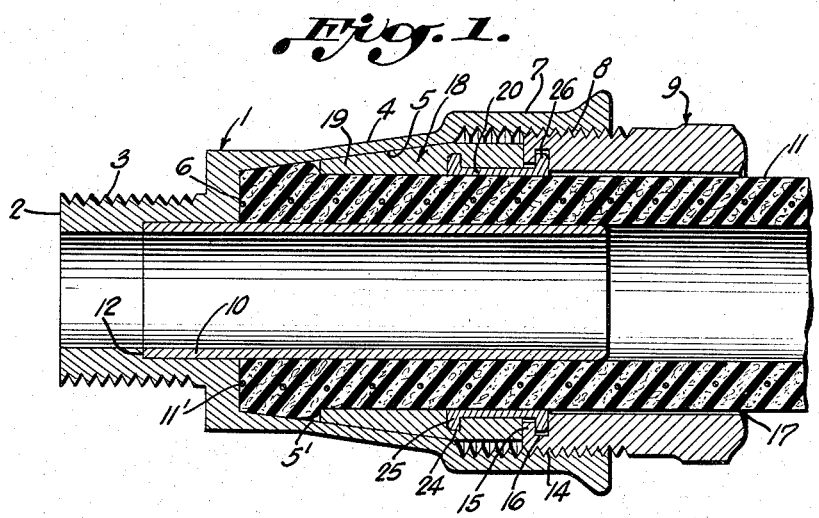
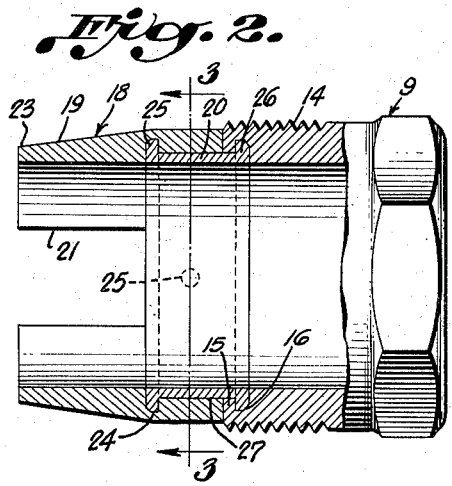
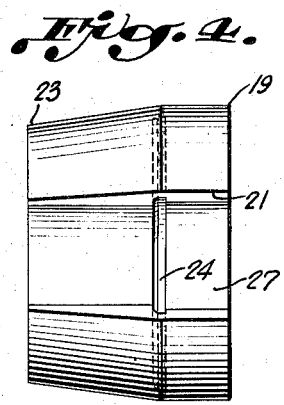
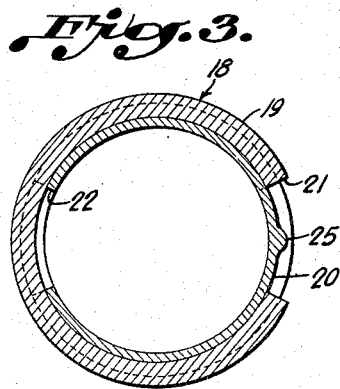
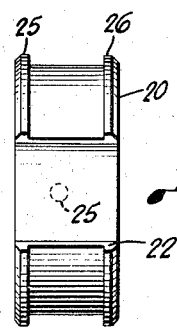
INVENTOR.
C. MAURICE MOORE
BY
Bacon + Thomas
ATTORNEY Patented Sept. 26, 1950

2,523,874

UNITED STATES PATENT OFFICE 2,523,874

HOSE COUPLING DEVICE AND COMPRESSION MEMBER FOR USE THEREIN

Clyde Maurice Moore, Richmond, Va.

Application June 29, 1949, Serial No. 102,026

4 Claims. (Cl. 285—86)

1

This invention relates to a hose coupling device and a compression member for use therein, and more particularly to coupling devices for use in making hose and/or pipe connections.

One object of the invention is to provide a coupling wherein a contracting annular wedging action is produced for contracting and binding the end of a hose in the coupling around a shank or nipple to provide a primary seal, and for advancing the extremity of the hose into the coupling and against a shoulder for effectively sealing the end face of the hose in the coupling by a powerful axial thrust, thereby providing a secondary seal.

Another object of the invention is to provide a novel compression member for producing the above-mentioned wedging action.

Another object of the invention is to provide an efficient, simply constructed and durable coupling device that can be quickly and easily connected to or disengaged from a hose without the use of special tools or equipment, and can in fact, be so connected and disengaged entirely by hand.

Other and further objects of the invention will become apparent as the description proceeds, reference being made to the accompanying drawings forming a part of the present disclosure, wherein:

Fig. 1 is a longitudinal sectional view taken through a hose coupling constructed according to the present invention showing the hose compressed and advanced into sealing engagement in the coupling.

Fig. 2 is a longitudinal sectional view taken through the compression member and nut, parts being shown in side elevation.

Fig. 3 is a sectional view taken along the line 3—3 of Fig. 2, looking in the direction of the arrows.

Fig. 4 is a side elevational view of one of the compression elements and,

Fig. 5 is a side elevational view of the other of the compression elements.

Referring to the drawings in which one form of coupling device constructed according to the invention is shown, it will be seen that my device comprises a housing or female member 1 having a cylindrical end portion 2 which may be provided with a male or female thread depending upon whether the outlet to which it is to be connected is internally or externally threaded. In the embodiment shown, the end portion 2 is provided with an external screw thread 3 which is adapted to screw into the screw thread of the outlet of a gasoline or oil pump, or tank, a nozzle, or the like. It may be noted that insofar as the gasoline or oil pump or tank and the like is concerned, the female member or housing may be made an integral part of the pump, tank, nozzle, or the like structure, if desired, since it is never necessary to place this member in a vise or the like to remove and replace the housing.

Integrally associated with the cylindrical end portion 2 of the housing 1 is a sleeve 4 having a tapering inner surface or wall 5 of frustoconical configuration forming an inwardly or forwardly converging tapered bore 5'. The smallest diameter of the bore 5' is larger than the inner diameter of the end portion 2 and thus an annular shoulder 6 is provided at the inner end of the sleeve 4. The outer end portion 7 of the sleeve 4 is cylindrical or of uniform inner diameter and provided with an internal screw thread 8 adapted to receive a substantially annular male member or compression nut 9.

The cylindrical end portion 2 of the housing 1 carries a nipple or shank 10 therein which extends into and through the sleeve 4 to substantially the outer end thereof. The nipple 10 extends through the sleeve 4 in spaced relation thereto and provides therewith a substantially annular space or chamber into which the free end of a flexible hose 11 is received.

Preferably the nipple or shank 10 is positioned within an annular recess 12 provided within the cylindrical end portion 2 at the inner end portion thereof, and the hose 11 is provided with static electricity wire means 11' which may be pulled out slightly at the inner end of the hose to form a static bond with the shoulder 6, thereby assuring prompt grounding of any static electricity that may be generated.

The annular compression nut 9 is provided with an external screw thread 14 at the forward end thereof which is adapted to be received by the screw thread 8 of the member 1. Also this end of the nut 9 is provided with an inwardly directed annular flange or wall 15. Rearwardly of the flange 15 and adjacent thereto is an annular recess or groove 16, and preferably the inner surface of the flange 15 has a larger diameter than the inner diameter of the main body portion of the nut 9. Preferably the inner wall of the nut 9 at the rearward end thereof is flared outwardly as indicated at 17 to prevent damage to the hose.

The compression member 18 is annular in form and comprises a pair of unitary, axially aligned, metallic, annular or ring-like elements 19 and 20. The forward end portion of the element 20 is positioned within the element 19, and each of the elements 19 and 20 is of split-ring form and has a slot 21 and 22 respectively extending in a continuous manner therethrough throughout a substantial angle to render each element resilient or compressible radially inwardly.

The angle through which each of the slots 21 and 22 extends is preferably approximately 49°. This angle will vary, however, depending upon the particular metal used, the thickness of the metal, etc. and thus the value of 49° is given merely by way of illustration and not by way of limitation.

The element 19 includes a forward frusto-conical portion in side elevation, converging forwardly as illustrated, and the tapering outer wall 23 thereof has the same taper as the frusto-conical wall 5. Due to tolerances of the hose, it has been found that this angle of taper should be approximately 5° in order for the same coupling to accommodate hose having relatively large tolerances, and, in addition, the use of an angle of approximately 5° substantially standardizes the overall length of the coupling regardless of size (diameter). For example, the coupling designed for use with 1½" diameter hose need be no longer than the coupling designed for use with ½" diameter hose. The maximum diameter of the tapering bore 5' is preferably just slightly greater than the minimum outer diameter of the member 19. This relationship provides substantially maximum compressibility and at the same time permits the compression member to be easily started into the tapering bore 5' before being compressed.

The wall 23 of the element 19 in assembled relationship closely engages the wall 5 of the coupling assembly and since the angle of taper of the bore 5' is equal to the angle of the taper of the wall 23, and since the forward end portion of the element 20 is positioned within the element 19, the compressive stresses are uniformly distributed throughout the entire peripheral area of the compression elements 19 and 20. Preferably the axial length of the bore 5' slightly exceeds the axial length of the compression element 19 to provide room for expansion of the end of the hose 11, and assuming that the movement of the compression member into the bore 5' is limited to alignment of the rearward end of the element 19 with the rearward end of the bore 5', it is only necessary that the maximum outer diameter of the element 19 be greater than the maximum diameter of the bore 5' in order to cause compression of the compression member. In general, it may be stated that the compression element 19 has larger outer diametrical dimensions than the diametrical dimensions of the tapering bore 5'.

The element 19 is provided with an internal annular groove or recess 24 preferably spaced slightly from the rearward end thereof, and the element 20, which is preferably of cylindrical configuration, is provided with outwardly directed annular flanges 25 and 26 at the ends thereof, the flange 25 being received in the groove 24 of the element 19 and the flange 26 being received in the recess 16 of the nut 9 in assembled relationship thereby connecting said elements and nut together.

Preferably, but not necessarily, the inner surface or wall of the element 19 rearwardly of the groove 24 is outwardly offset or of increased diameter as indicated at 27 whereby when the element 20 is received therein a smooth internal surface will be provided by the inner wall surfaces of the elements 19 and 20 or within the compression member 18.

In assembled relation, the longitudinal center of the slot 21 of the element 19 is preferably spaced approximately 180° from the longitudinal center of the slot 22 of the element 20, whereby such slots are diametrically opposed, and preferably a projection 25 is provided on the outer peripheral surface of the element 20 or equivalent means provided to limit the relative rotational movement between the elements 19 and 20. Preferably, as illustrated, the projection 25 is positioned diametrically opposite the longitudinal center of the slot 22.

The outer diameter of the main body portion of the cylindrical element 20 is substantially equal to the diameter of the wall 27 and as indicated above the forward end portion thereof is received within the rearward portion of the element 19.

In assembling the compression member 18 the longitudinal centers of the slots 21 and 22 are displaced approximately 180°, the element 20 is compressed radially inwardly and the flange 25 positioned in the groove 24. Thus assembled, there is no substantial relative axial movement between the elements 19 and 20, and the projection 25 is so positioned as to engage the sides of the slot 21 to limit the relative angular or rotational movement between the elements 19 and 20.

In assembled relationship, the rearward end portion of the element 20 projects or extends beyond the rearward end of the element 19, spacing the flange 26 therefrom, and in assembling the nut 9 with the compression member 18 it is only necessary to compress the elements 19 and 20 radially inwardly until the flange 15 of the nut 9 will pass over the flange 26 to be received in the space between such flange and the rearward end of the element 19, the flange 26 being received in the recess 16.

In the preferred manner of assembling my coupling device, the nut 9 with the compression member 18 connected thereto is slipped over the end of the hose and positioned rearwardly of the end of the hose a distance sufficient to permit the end of the hose to be easily passed over the nipple 10 and abut the shoulder 6. Then the nut 9 is forced forwardly, the wall 15 engaging the rearward end of the element 19 and/or the flange 26 engaging the rearward wall of the recess 16, thereby pushing the compression member into the sleeve 4 until the thread 14 reaches the thread 8. The nut 9 is then rotated to screw the thread 14 into the thread 8.

The compression member frictionally engages the outer surface of the hose 11, and as the nut 9 is axially advanced into the sleeve 4, the compression member comprising the elements 19 and 20 is gradually contracted about the hose incident to the taper of the wall 5 and the hose is contracted about the nipple 10. By staggering the splits or slots in the split-ring compression elements in the manner described above, a more uniform contraction of the hose about the nipple is obtained. The frictional engagement between the compression member and the hose 11 is such that the compression member is held from turning on the hose and as the nut progresses axially into the housing the hose is urged forwardly toward the annular shoulder 6 and the end portion of the hose is caused to become compressed axially and expanded radially. Thus a primary seal is provided between the hose 11 and the nipple 10 and a secondary seal is provided between the end of the hose and the annular shoulder 6.

An important feature of the invention is that the connecting means (element 20) which rotatably connects the compression member 18 and the wedge driving male member 9 permits relative rotation between the male member 9 and the hose, but allows the compression member 18 to clamp the hose without relative rotational movement therebetween. Also, the connection prevents accidental separation of the compression member 18 and the male member 9 when the device is uncoupled. This makes it much easier to place the assembly comprising the members 9 and 18 in position on the end of the hose.

As indicated previously, the nut may be actuated entirely by hand if desired. By actual test a hose connected to my coupling device by hand has withstood pressures up to 500 pounds per square inch without leaking. The ordinary operating pressure in gasoline pumps, gasoline fuel oil tanks and the like is approximately 40 pounds per square inch. Upon failure of the hose at or within the coupling, the nut 9 may be backed out of the sleeve 4, the nut carrying therewith the compression member 18, and the hose pulled from the nipple 10. The faulty end of the hose may be cut off and the hose reconnected to the coupling device in the manner previously described.

This application is a continuation-in-part of my prior application, Serial No. 771,358, filed August 29, 1947, now Patent No. 2,516,583, and relating to Hose Coupling Devices and Compression Members for Use Therein to which reference may be made if desired for a more complete understanding of the present invention.

While the invention is susceptible of various modifications and alternative constructions, I have shown in the drawings and have herein described in detail the preferred embodiment, but it is to be understood that I do not thereby intend to limit the invention to the specific form disclosed but intend to cover all modifications and alternative constructions falling within the spirit and scope of the invention as expressed in the appended claims.

I claim:

1. In a compression member for use in a flexible hose coupling device, a pair of axially aligned split-ring elements, one of said elements having an external tapered wall surface and an internal annular groove, the other of said elements being substantially cylindrical and having outwardly projecting annular flanges adjacent the ends thereof, the forward end portion of said other of said elements being positioned within said one of said elements with said annular groove receiving one of said flanges and connecting said elements together, the splits in said elements being diametrically opposed, and means limiting the relative rotational movement of said pair of elements.

2. In a compression member for use in a flexible hose coupling device, a pair of axially aligned split-ring elements, one of said elements having an external wall surface tapered at an angle of approximately 5° and an internal annular groove, the other of said elements being substantially cylindrical and having outwardly projecting annular flanges adjacent the ends thereof, the forward end portion of said other of said elements being positioned within said one of said elements with said annular groove receiving one of said flanges and connecting said elements together, the splits in said elements being diametrically opposed, and means limiting the relative rotational movement of said pair of elements.

3. A coupling device comprising a housing, said housing comprising an annular shoulder and a sleeve, said sleeve having a forwardly tapered bore portion and a threaded end portion, a nipple within said housing adapted to receive a hose or the like, said nipple extending into said tapered bore portion and forming an annular space with said sleeve, a compression member within said tapered bore, said compression member comprising a pair of axially aligned split-ring elements, one of said elements having an external tapered wall surface and an internal annular groove, the other of said elements being substantially cylindrical and having outwardly projecting annular flanges adjacent the ends thereof, the forward end portion of said other of said elements being positioned within said one of said elements with said annular groove receiving one of said flanges and connecting said elements together, and an externally threaded annular compression nut in threaded engagement with said threaded end portion of said sleeve, said compression nut urging said compression member forwardly into said tapered bore and comprising a forward annular wall, said compression nut having an annular recess rearwardly of said annular wall receiving the other of said annular flanges and connecting said compression member to said nut, the tapered bore portion of said sleeve compressing said compression member radially inwardly.

4. A coupling device comprising a housing, said housing comprising an annular shoulder and a sleeve, said sleeve having a forwardly tapered bore portion and a threaded end portion, a nipple within said housing adapted to receive a hose or the like, said nipple extending into said tapered bore portion and forming an annular space with said sleeve, a compression member within said tapered bore, said compression member comprising an annular element having an external tapered wall surface, a slot extending in a continuous manner entirely through said element, whereby said element may be compressed radially inwardly, means forming an internal annular groove in said element, the internal wall of said element rearwardly of said groove being outwardly offset, a second substantially cylindrical annular element, a slot extending in a continuous manner entirely through said second element whereby said second element may be compressed radially inwardly, said second element having outwardly projecting annular flanges adjacent the ends thereof, said first element receiving the forward end portion of said second element therein with one of the annular flanges thereof positioned in said annular groove, and an externally threaded annular compression nut in threaded engagement with said threaded end portion of said sleeve, said compression nut urging said compression member forwardly into said tapered bore and comprising a forward annular wall, said compression nut having an annular recess rearwardly of said annular wall receiving the other of said annular flanges and connecting said compression member to said nut, the tapered portion of said sleeve compressing said compression member radially inwardly.

CLYDE MAURICE MOORE.

REFERENCES CITED

The following references are of record in the file of this patent:

UNITED STATES PATENTS

| Number | Name | Date |
|---|---|---|
| 796,599 | McIntyre | Aug. 8, 1905 |
| 1,567,324 | Jurs | Dec. 29, 1925 |
| 1,699,591 | Jennings | Jan. 22, 1929 |
| 2,428,176 | Parker | Sept. 30, 1937 |

FOREIGN PATENTS

| Number | Country | Date |
|---|---|---|
| 165,293 | Great Britain | June 30, 1920 |
| 431,320 | Great Britain | July 4, 1935 |
| 492,959 | Great Britain | Sept. 29, 1938 |
| 654,476 | France | Nov. 29, 1928 |